United States Patent

Nakajima

Patent Number: 6,072,533
Date of Patent: Jun. 6, 2000

[54] SIGNAL DISCRIMINATOR AND SYNC SIGNAL GENERATOR

[75] Inventor: Takayuki Nakajima, Kanagawa, Japan

[73] Assignee: Sony Corporation, Tokyo, Japan

[21] Appl. No.: 08/782,882

[22] Filed: Jan. 14, 1997

[30] Foreign Application Priority Data

Jan. 19, 1996 [JP] Japan ................................ 8-024803

[51] Int. Cl.[7] .............................. H04N 5/06; H04N 5/08; H04N 5/10
[52] U.S. Cl. .................... 348/521; 348/500; 348/525; 348/524; 348/522; 358/153
[58] Field of Search ..................... 348/521, 522, 348/524, 500, 525, 516, 517, 529, 530, 531; 358/153; H04N 5/073, 5/06, 5/08, 5/10

[56] References Cited

U.S. PATENT DOCUMENTS

| | | | |
|---|---|---|---|
| 3,755,811 | 8/1973 | Breckman | 343/6.5 R |
| 4,450,474 | 5/1984 | Mizukami | 358/19 |
| 4,701,796 | 10/1987 | Kamiya | 358/154 |
| 4,769,704 | 9/1988 | Hirai et al. | 358/148 |
| 5,315,387 | 5/1994 | Tachibana | 348/521 |
| 5,414,470 | 5/1995 | Hotta et al. | 348/530 |
| 5,486,868 | 1/1996 | Shyu et al. | 348/521 |
| 5,502,499 | 3/1996 | Birch et al. | 348/523 |
| 5,510,847 | 4/1996 | Nio et al. | 348/554 |
| 5,539,343 | 7/1996 | Yamashita et al. | 348/524 |
| 5,581,303 | 12/1996 | Djabbari et al. | 348/524 |
| 5,614,956 | 3/1997 | Matsuura | 348/556 |
| 5,686,968 | 11/1997 | Ujiie et al. | 348/521 |
| 5,748,252 | 5/1998 | Draves | 348/516 |
| 5,771,076 | 6/1998 | Kim | 348/524 |
| 5,786,867 | 7/1998 | Suh | 348/521 |
| 5,790,200 | 8/1998 | Tsujimoto et al. | 348/545 |

FOREIGN PATENT DOCUMENTS

| | | | |
|---|---|---|---|
| 2-309768 | 12/1990 | Japan | H04N 5/08 |
| 4-259167 | 9/1992 | Japan | H04N 5/06 |
| 5-56300 | 3/1993 | Japan | H04N 5/06 |

*Primary Examiner*—John K. Peng
*Assistant Examiner*—Jean W. Désir
*Attorney, Agent, or Firm*—Frommer, Lawrence & Haug, LLP; William S. Frommer

[57] ABSTRACT

A sync signal generator with a signal discriminator comprising an input terminal supplied with a fist signal or a second signal of a higher frequency; a clock signal generating circuit; a first counter reset by the first or second signal received from an input terminal, and caused to halt counting the clock signal when the count thereof has reached a predetermined value MC4; a first detector for outputting a detection signal relative to the first or second signal during the counting action of the first counter; a second counter reset when the count of the first counter has reached a predetermined value MC1, and caused to halt counting the clock signal when the count of the first counter has reached a predetermined value MC2 (MC2<MC4), and to output a detection signal (SMAX) when the count thereof has reached another predetermined value SC1 (SC1<MC2); a second detector for outputting a detection signal relative to the second signal in response to the detection signal (SMAX) from the second counter; and a third detector supplied with the detection signals from the first and second detectors and outputting a discrimination signal relative to the first and second signals in accordance with such detection signals. The first signal is a square wave signal formed out of an alternating current obtained from an AC power source, and the second signal is a burst signal separated from a video signal.

12 Claims, 7 Drawing Sheets

SIGNAL DISCRIMINATOR AND SYNC SIGNAL GENERATOR

BACKGROUND OF THE INVENTION

The present invention relates to a signal discriminator and a sync signal generator equipped with such a signal discriminator, and more particularly to those adapted to be applied to a high-density integrated circuit (IC).

It has been known in the related art heretofore that some video cameras or the like functionally have an internal sync mode to output a video signal produced in the individual device and an external sync mode to output a video signal synchronized with an external signal inputted from an external apparatus.

In a video camera of the type mentioned above, an internal sync mode is selected when the camera is operated individually, then a sync signal is generated in accordance with a signal produced in a sync signal generator incorporated therein, and a video signal synchronized with such a sync signal is outputted.

Meanwhile, when an alternating voltage signal of 60 Hz for example is inputted as an external signal from an AC power source of an external apparatus, there is selected a line lock mode which is one external sync mode, so that a sync signal synchronized in timing with the alternating voltage signal of 60 Hz is generated in the sync signal generator, and then a video signal synchronized with this sync signal is outputted.

Also when a monochrome video signal for example is inputted as an external signal from an external apparatus, there is selected a VS lock mode which is another external sync mode, where a sync signal synchronized with the monochrome video signal is generated in the sync signal generator, and then a video signal synchronized with this sync signal is outputted.

Further when a color video signal for example is inputted as an external signal from an external apparatus, there is selected a VBS lock mode which is still another external sync mode, where a sync signal synchronized with the color video signal is generated in the sync signal generator, and a video signal synchronized with this sync signal is outputted.

Generally the sync signal generator employed in the above-described video camera is formed into an IC, and exclusive input terminals are provided for respective kinds of external signals for producing sync signals.

With the recent technical progress achieved in enhancing the functions of apparatus, ICs are also developed in regard to the integration density, and remarkable increase is realized in the number of component circuits incorporated in each IC.

Consequently, there arises a great increase in the number of terminals required for the increased internal component circuits. However, since the number of terminals providable in each IC is limited, it follows that the number of input-output terminals of an interface is also restricted.

Accordingly, it has been demanded heretofore that, in the sync signal generator which is one of the component circuits incorporated in the IC, one of input terminals for a plurality of external signals fed from external apparatus is used in common to thereby reduce the number of input terminals allocated to the sync signal generator.

SUMMARY OF THE INVENTION

It is an object of the present invention to provide a signal discriminator capable of discriminating between different kinds of signals inputted to one input terminal, and also to provide a sync signal generator equipped with such a signal discriminator.

According to one aspect of the present invention, there is provided a signal generator which comprises an input terminal supplied with a first signal or a second signal higher in frequency than the first signal; a discriminating means supplied with the first or second signal from the input terminal, then discriminating between the first and second signals, and outputting a discrimination signal; a signal generating means supplied with the first or second signal from the input terminal and also with the discrimination signal from the discriminating means, and outputting a signal synchronized with the first or second signal in accordance with the discrimination signal; and an output terminal supplied with the signal, which is synchronized with the first or second signal, from the signal generating means.

The signal generator further comprises a clock generating means which supplies a clock signal to the signal generating means, wherein, when none of the first and second signals is supplied to the input terminal, the signal generating means generates a signal synchronized with the clock signal.

The signal generator further comprises an external signal generating means connected to the input terminal and supplying the first or second signal to the input terminal. Preferably, the external signal generating means forms a square wave signal out of an alternating current obtained from an AC power source and then supplies the square wave signal as the first signal to the input terminal, or separates a burst signal from an external video signal and supplies the burst signal as the second signal to the input terminal.

The external signal generating means separates a sync signal from the external video signal. And the signal generator further has a second input terminal supplied with the sync signal, and a sync signal discriminating circuit supplied with the sync signal from the second input terminal. The sync signal obtained from the second input terminal and a sync signal discrimination signal obtained from the sync signal discriminating circuit are both supplied to the signal generating means, which then produces, on the basis of the sync signal discrimination signal, a signal synchronized with the sync signal received from the second input terminal.

According to another aspect of the present invention, there is provided a signal discriminator which comprises an input terminal supplied with a first signal or a second signal higher in frequency than the first signal; a clock generating circuit for generating a clock signal; a first counter supplied with the clock signal from the clock generating circuit and reset by the first or second signal received from the input terminal, wherein the first counter halts counting the clock signal when the count thereof has reached a third predetermined value (MC4); a first detecting means for outputting a detection signal relative to the first or second signal during the counting action of the first counter; a second counter supplied with the clock signal which is the first or second signal and reset when the count of the first counter has reached the first predetermined value (MC1), wherein the second counter halts counting the clock signal when the count of the first counter has reached a second predetermined value (MC2: MC2<MC4), and the second counter outputs a detection signal (SMAX) when the count thereof has reached a fourth predetermined value (SC1); a second detecting means for outputting a detection signal relative to the second signal in response to the detection signal (SMAX) received from the second counter; and a third detecting means supplied with the detection signals from both the first and second detecting means and outputting a discrimination signal relative to the first and second signals in accordance with such detection signals. In this signal discriminator, the first signal is a square wave signal formed out of an alternating current obtained from an AC power source, and the second signal is a burst signal separated from the video signal.

In the sync signal generator, either an internal sync mode or a plurality of external sync modes can be automatically selected in accordance with the outputs of the first and second detecting means.

Meanwhile in the signal discriminator, the kind of the input signal is discriminated depending on whether the count of the first counter reset by the input signal is reset before reaching the third predetermined value (MC4) or whether the second counter for counting the input signal has reached the fourth predetermined value (SC1) when the count of the first counter has reached the second predetermined value (MC2). Therefore, when any of different kinds of signals is fed to one input terminal, it is possible to discriminate between the plurality of input signals.

The above and other features and advantages of the present invention will become apparent from the following description which will be given with reference to the illustrative accompanying drawings.

DESCRIPTION OF THE PREFERRED EMBODIMENTS

Hereinafter some preferred embodiments of the present invention will be described with reference to the accompanying drawings.

Figure 1:
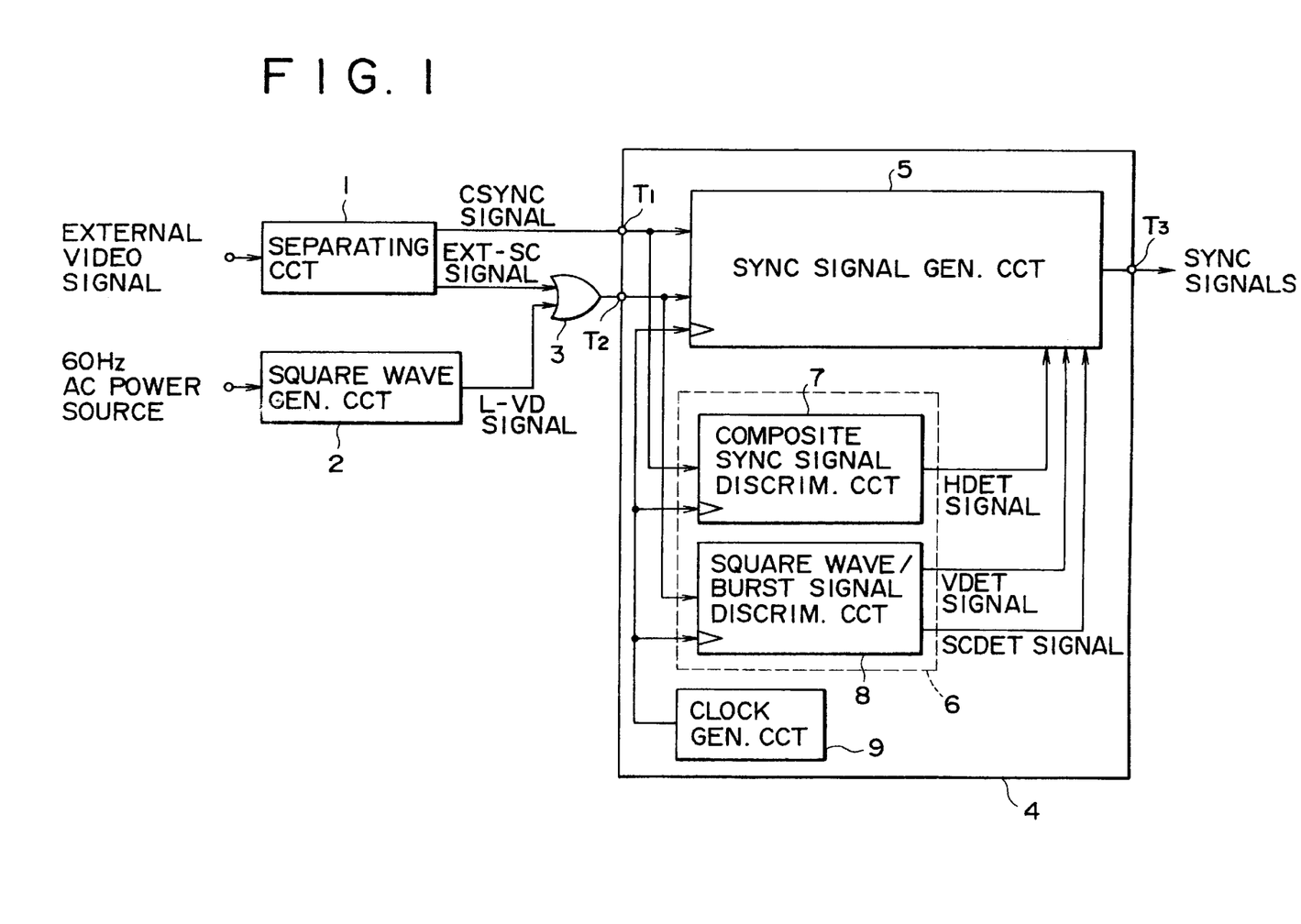
FIG. 1 is a block diagram of a sync signal generator representing an embodiment of the present invention.

FIG. 1 shows an exemplary sync signal generator representing an embodiment of the present invention which is equipped with a signal discriminator and is employed in a video camera or the like.

In this diagram, a separating circuit 1 separates a composite sync signal (CSYNC) from an external video signal such as a monochrome video signal or a color video signal received from an external apparatus and then outputs such a composite sync signal to an input terminal $T_1$ of a sync signal generator 4. If the input video signal is a color one, the circuit 1 further separates a burst signal (EXT-SC) therefrom and then outputs the burst signal to an OR circuit 3.

When an alternating voltage signal of 60 Hz for example is inputted from an external AC power source, a square wave generating circuit 2 generates a square wave signal (L-VD) by shaping the alternating voltage signal and then outputs the square wave signal to the OR circuit 3.

When a burst signal (EXT-SC) is supplied from the separating circuit 1, or when a square wave signal (L-VD) is supplied from the square wave generating circuit 2, the OR circuit 3 outputs these signals to an input terminal $T_2$ of the sysnc signal generator 4.

The sync signal generator 4 consists of a sync signal generating circuit 5, a signal discriminator 6 enclosed with a dotted line, and a clock generating circuit 9, all of which are incorporated in an IC (integrated circuit).

The sync signal generating circuit 5 is so formed as to operate in an internal sync mode when none of external signals is received. In this case, this circuit 5 generates various sync signals including horizontal and vertical sync signals of predetermined periods in accordance with a clock signal supplied from the clock generating circuit 9, and then outputs the sync signals from its output terminal $T_3$.

When a square wave signal (L-VD) for example is fed from an input terminal $T_2$, the circuit 5 operates in a line lock mode which is one external sync mode, then generates various sync signals such as horizontal and vertical sync signals synchronized with the square wave signal (L-VD), and outputs the sync signals from the output terminal $T_3$.

And when a composite sync signal (CSYNC) for example is fed from the input terminal $T_1$, the circuit 5 operates in a VS lock mode which is another external sync mode, then generates various sync signals such as horizontal and vertical sync signals synchronized with the composite sync signal (CSYNC), and outputs the sync signals from the output terminal $T_3$.

In another case where a composite sync signal (CSYNC) is fed from the input terminal $T_1$ while a burst signal (EXT-SC) is fed from the input terminal $T_2$, the circuit 5 operates in a VBS lock mode which is still another external sync mode, then generates various sync signals such as horizontal and vertical sync signals synchronized with the composite sync signal (CSYNC), subsequently further generates a subcarrier signal, and outputs these signals from the output terminal $T_3$.

The signal discriminator 6 enclosed with a dotted line consists of a composite sync signal discriminating circuit 7 and a square wave/burst signal discriminating circuit 8. The composite sync signal discriminating circuit 7 discriminates between the presence and absence of a composite sync signal (CSYNC) fed from the input terminal $T_1$, and outputs a discrimination signal (hereinafter referred to as HDET signal) to the sync signal generating circuit 5 if the input composite sync signal (CSYNC) is present.

The square wave/burst signal discriminating circuit 8 discriminates between the presence and absence of a burst signal (EXT-SC) and a square wave signal (L-VD) fed from the input terminal $T_2$, and outputs a discrimination signal (hereinafter referred to as SCDET signal) to the sync signal generating circuit 5 if the input burst signal (EXT-SC) is present, or outputs another discrimination signal (hereinafter referred to as VDET signal) to the sync signal generating circuit 5 if the input square wave signal (L-VD) is present.

Now an explanation will be given on an internal sync mode and external sync modes relative to the operation of the signal discriminator 6 included in the sync signal generator 4 mentioned above.

Internal sync mode

When none of external signals is inputted to the video camera, i.e., when there exists neither the external signal to be supplied from the separating circuit 1 to the input terminal $T_1$ of the sync signal generator 4 nor the external signal to be supplied from the square wave generating circuit 2 to the input terminal $T_2$, the composite sync signal discriminating circuit 7 in the signal discriminator 6 outputs a low-level HDET signal to the sync signal generating circuit 5, while the square wave/burst signal discriminating circuit 8 outputs a low-level VDET signal and a low-level SCDET signal to the sync signal generating circuit 5.

In this case, the sync signal generator 4 is placed in the internal sync mode, and operates in accordance with the clock signal obtained from the clock generating circuit 9, thereby generating various sync signals such as horizontal and vertical sync signals of predetermined periods and outputting such sync signals from the output terminal $T_3$.

Line lock mode

When only an alternating voltage signal is inputted as an external signal from an AC power source to the video camera, i.e., when an alternating voltage signal of 60 Hz for example is inputted to the square wave generating circuit 2 and then a shaped square wave signal (L-VD) is fed to the input terminal $T_2$ of the sync signal generator 4, the composite sync signal discriminating circuit 7 in the signal discriminator 6 outputs a low-level HDET signal, while the square wave/burst signal discriminating circuit 8 outputs both a high-level VDET signal and a low-level SCDET signal to the sync signal generating circuit 5.

In this case, the sync signal generator 4 is placed in the line lock mode, where the sync signal generating circuit 5 generates a sync signal synchronized with the square wave signal (L-VD) and then outputs such a sync signal therefrom.

VS lock mode

Next, when only a monochrome video signal is inputted as an external signal to the video camera, i.e., when a monochrome video signal for example is inputted to the separating circuit 1 and the composite sync signal (CSYNC) separated in the separating circuit 1 is fed to the input terminal $T_1$ of the sync signal generator 4, the composite sync signal discriminating circuit 7 outputs a high-level HDET signal to the sync signal generating circuit 5, while the square wave/burst signal discriminating circuit 8 outputs both a low-level VDET signal and a low-level SCDET signal to the sync signal generating circuit 5.

In this case, the sync signal generator 4 is placed in the VS lock mode, where the horizontal and vertical sync signals are separated from the composite sync signal (CSYNC) in the sync signal generating circuit 5, and then a vertical counter employed as a line counter in the sync signal generating circuit 5 is reset by the vertical sync signal thus separated.

Further the phase of the horizontal sync signal separated from the composite sync signal (CSYNC) is compared with the phase of the generated horizontal sync signal by a PLL circuit or the like included in the sync signal generating circuit 5, and then a sync signal synchronized with the external input composite sync signal (CSYNC) is outputted.

VBS lock mode

Next, when only a color video signal is inputted as an external signal to the video camera, i.e., when a color video signal is inputted to the separating circuit 1 and then the composite sync signal (CSYNC) separated in the separating circuit 1 is fed to the input terminal $T_1$ of the sync signal generator 4 while the burst signal (EXT-SC) separated in the separating circuit 1 is fed via the OR circuit 3 to the input terminal $T_2$, the composite sync signal discriminating circuit 7 outputs a high-level HDET signal, while the square wave/burst signal discriminating circuit outputs both a high-level SCDET signal and a low-level VDET signal to the sync signal generating circuit 5.

In this case, the sync signal generator 4 is placed in the VBS lock mode, where the horizontal and vertical sync signals are separated from the input composite sync signal (CSYNC) in the sync signal generating circuit 5, and then the vertical counter employed as a line counter in the sync signal generating circuit 5 is reset by the vertical sync signal thus separated.

Subsequently the phase of the horizontal sync signal separated from the composite sync signal (CSYNC) is compared with the phase of the generated horizontal sync signal by a PLL circuit or the like included in the sync signal generating circuit 5, and then a sync signal synchronized with the composite sync signal (CSYNC) is outputted.

Further the phase of a subcarrier signal generated in the sync signal generating circuit 5 is compared with the phase of the input burst signal (EXT-SC) by the PLL circuit or the like, and then a subcarrier signal synchronized with the input burst signal (EXT-SC) is outputted.

Due to the above-described configuration of the sync signal generator 4, both the burst signal (EXT-SC) and the square wave signal (L-VD) can be fed to the input terminal $T_2$. More specifically, since two kinds of external signals can be fed to one input terminal $T_2$, it becomes possible to reduce the number of input terminals allocated to the sync signal generator 4 which is formed into an IC.

Figure 2:
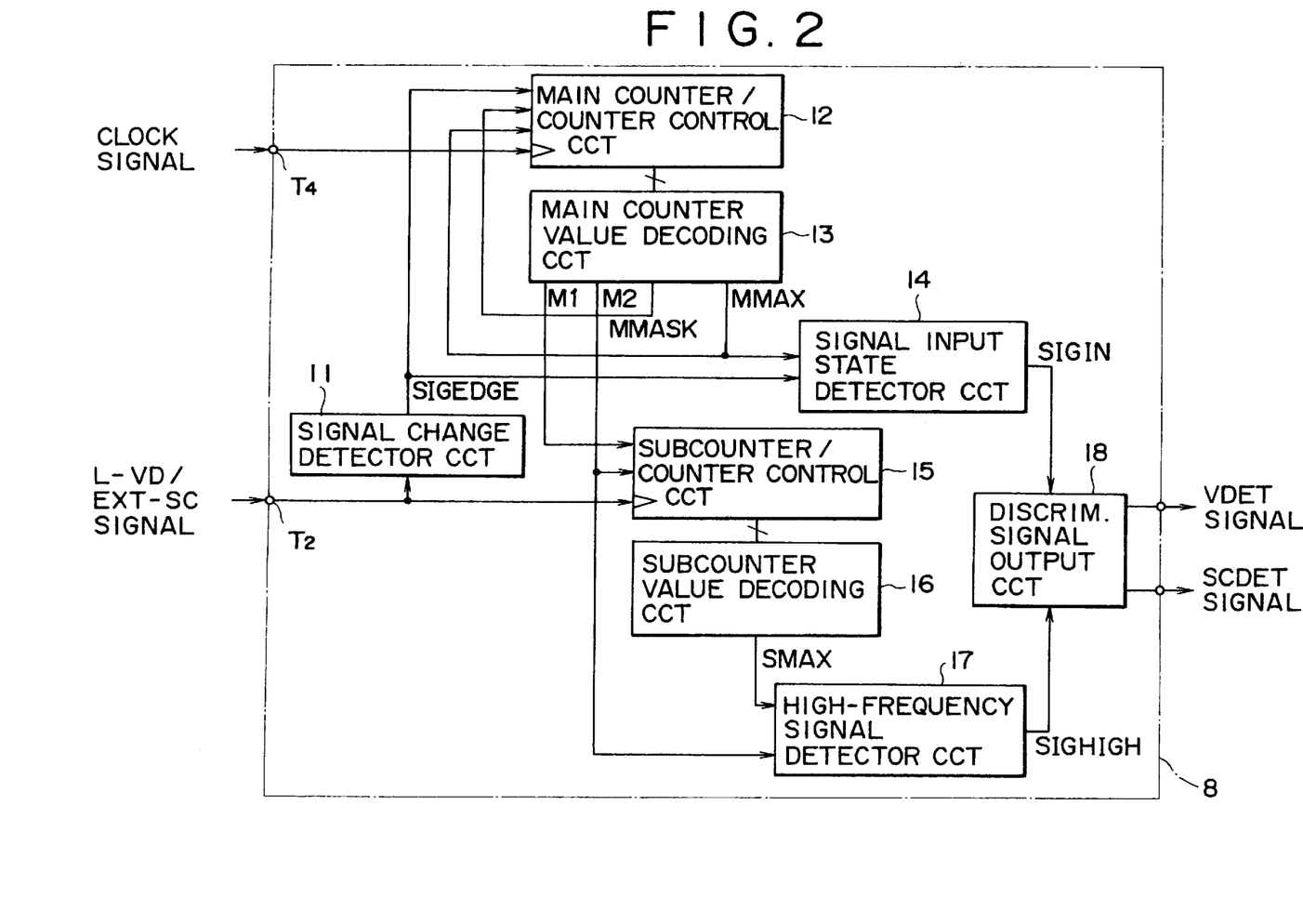
FIG. 2 is a block diagram of a signal discriminator representing another embodiment of the present invention.

FIG. 2 shows an exemplary block diagram of the square wave/burst signal discriminating circuit 8 in the signal discriminator 6 mentioned above.

In this diagram, a signal change detector circuit 11 detects a change of the square wave signal (L-VD) or the burst signal (EXT-SC) fed thereto via the input terminal $T_2$, and then outputs a pulse signal (hereinafter referred to as SIGEDGE signal) at a signal change point.

A main counter/main counter control circuit (hereinafter referred to as main counter circuit) 12 is driven to perform its counting action in accordance with the clock signal fed from an unshown clock generating circuit 9 via an input terminal $T_4$. And when a SIGEDGE signal is fed from the signal change detector circuit 11, the main counter circuit 12 is reset and starts its counting action. Meanwhile, when an undermentioned MMAX signal is fed from a main counter value decoding circuit (hereinafter referred to simply as decoding circuit) 13, the main counter circuit 12 halts its counting action.

However, if a SIGEDGE signal is fed from the signal change detector circuit 11 during input of an MMASK signal from the decoding circuit 13, the main counter circuit 12 is so controlled as not to be reset.

The decoding circuit 13 decodes the count value of the main counter circuit 12 and, depending on the decoded count value, outputs either a pulse signal (M1 signal) to control the count start action of a subcounter/counter control circuit (hereinafter referred to as subcounter circuit) 15, or a pulse signal (M2 signal) to control the count halt action of the subcounter circuit 15. The decoding circuit 13 further outputs an MMASK signal to control the SIGEDGE signal inputted to the main counter circuit 12, or a pulse signal (MMAX signal) to control the count halt action of the main counter circuit 12.

When the SIGEDGE signal is inputted from the signal change detector circuit 11, a signal input state detector circuit 14 outputs a SIGIN signal by detecting input of the square wave signal (L-VD) or a burst signal (EXT-SC) to the square wave/burst signal discriminating circuit 8. Meanwhile, when the MMAX signal is inputted from the decoding circuit 13 during output of the SIGIN signal, the circuit 14 detects halt of the external signal fed to the square wave/burst signal discriminating circuit 8 and then halts output of the SIGIN signal.

The count action of the subcounter circuit 15 is controlled by an M1 signal and an M2 signal inputted from the decoding circuit 13, and either a square wave signal (L-VD) or a burst signal (EXT-SC) is inputted as a clock signal via the input terminal $T_2$ to the subcounter circuit 15. This circuit 15 is reset by the M1 signal and then starts its count action, or halts the count action in response to input of the M2 signal.

A subcounter value decoding circuit (hereinafter referred to simply as decoding circuit) 16 decodes the count value of the subcounter circuit 15, and outputs a SMAX signal to a high frequency signal detector circuit 17 when the count of the counter has reached a predetermined value.

The SMAX signal from the decoding circuit 16 and the M2 signal from the decoding circuit 13 are both inputted to the high frequency signal detector circuit 17. And upon input of the SMAX signal, the circuit 17 stores this input data therein and subsequently outputs a SIGHIGH signal of a predetermined level in accordance with the input data at the input time point of the M2 signal.

A discrimination signal output circuit 18 outputs a VDET signal or a SCDET signal in accordance with the SIGIN signal obtained from the signal input state detector circuit 14 and also with the SIGHIGH signal obtained from the high frequency signal detector circuit 17.

When the square wave signal (L-VD) is fed to such square wave/burst signal discriminating circuit 8, the main counter circuit 12 detects the presence or absence of the alternating voltage signal of 60 Hz and then outputs a SIGIN signal, while the subcounter circuit 15 counts the square wave signal (L-VD) during the time period between the M1 and M2 signals inputted from the decoding circuit 13. In this case, since the subcounter circuit 15 counts the low-frequency signal of 60 Hz, its count becomes smaller than the predetermined value, so that a significant SMAX signal is not outputted and merely the SIGIN signal alone is outputted. Consequently, the sync signal generating circuit 5 is placed in the line lock mode which corresponds to the output VDET signal.

In case the burst signal (EXT-SC) signal is inputted, the main counter circuit 12 detects the presence or absence of the burst signal and outputs a SIGIN signal, while the subcounter circuit 15 counts the burst signal (EXT-SC) during the time period between the M1 and M2 signals inputted from the decoding circuit 13. In this case, since the burst signal has a high frequency, the count of the sub-counter circuit 15 reaches the predetermined value, so that a SMAX signal is outputted. Consequently the sync signal generating circuit 5 is placed in the VBS lock mode corresponding to the SCDET signal.

When a monochrome signal is inputted, no signal is fed to the input terminal $T_2$ or $T_4$ either, so that none of the VDET signal or the SCDET signal is outputted from the square wave/burst signal discriminating circuit 8. However, since the composite sync signal is inputted to the composite sync signal discriminating circuit 7 and the HDET signal is outputted therefrom, the sync signal generating circuit 5 is placed in the VS lock mode.

Hereinafter the signal discrimination method carried out in the square wave/burst signal discriminating circuit 8 will be described with reference to waveform charts of FIGS. 3 to 7.

Figure 3:
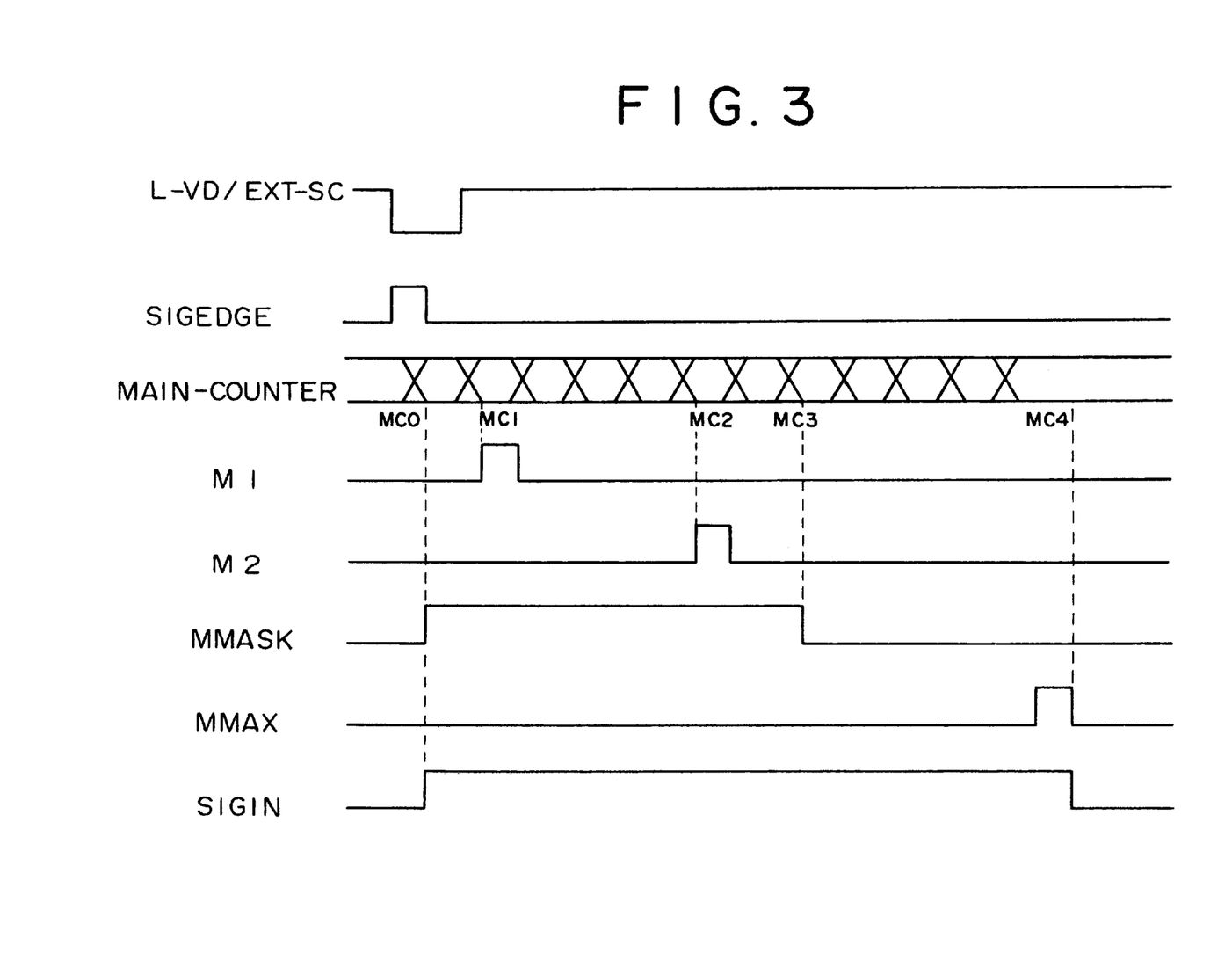
FIG. 3 is a waveform chart of signals obtained in component circuits when a single square-wave signal is inputted to the signal discriminator.

FIG. 3 shows waveforms of signals obtained in the component elements of the square wave/burst signal discriminating circuit 8 when a square wave signal (L-VD) is inputted thereto.

When a square wave signal (L-VD) is fed to the input terminal $T_2$, an amplitude change of the square wave signal (L-VD) is detected in the signal change detector circuit 11, which then outputs a SIGEDGE signal to the main counter circuit 12 and the signal input state detector circuit 14.

In this case, the main counter circuit 12 starts its count after being reset (MC0) in synchronism with the trailing edge of the SIGEDGE signal, and the count value thereof is decoded in the decoding circuit 13.

The decoding circuit 13 turns the MMASK signal from a low level to a high level upon start of the count, i.e., at the time point when the decoded count value thereof is MC0, and then outputs the high-level MMASK signal to the main counter circuit 12. The decoding circuit 13 further turns the MMASK signal from a high level to a low level when the decoded count value has reached a predetermined value MC3.

Meanwhile the signal input state detector circuit 14 turns the SIGIN signal from a low level to a high level in synchronism with the trailing edge of the SIGEDGE signal, and then outputs the high-level SIGIN signal to the discrimination signal output circuit 18.

If any new square wave signal (L-VD) is not inputted until another predetermined value MC4 after the decoded count value of the decoding circuit 13 reaches the predetermined value MC3 where the MMASK signal is turned to a low level, the decoding circuit 13 outputs the MMAX signal to the main counter circuit 12 and the signal input state detector circuit 14.

And the main counter circuit 12 halts its counting action in response to the MMAX signal inputted thereto.

The signal input state detector circuit 14 turns the SIGIN signal from a high level to a low level in synchronism with the trailing edge of the MMAX signal, and then outputs the low-level SIGIN signal to the discrimination signal output circuit 18.

Figure 4:
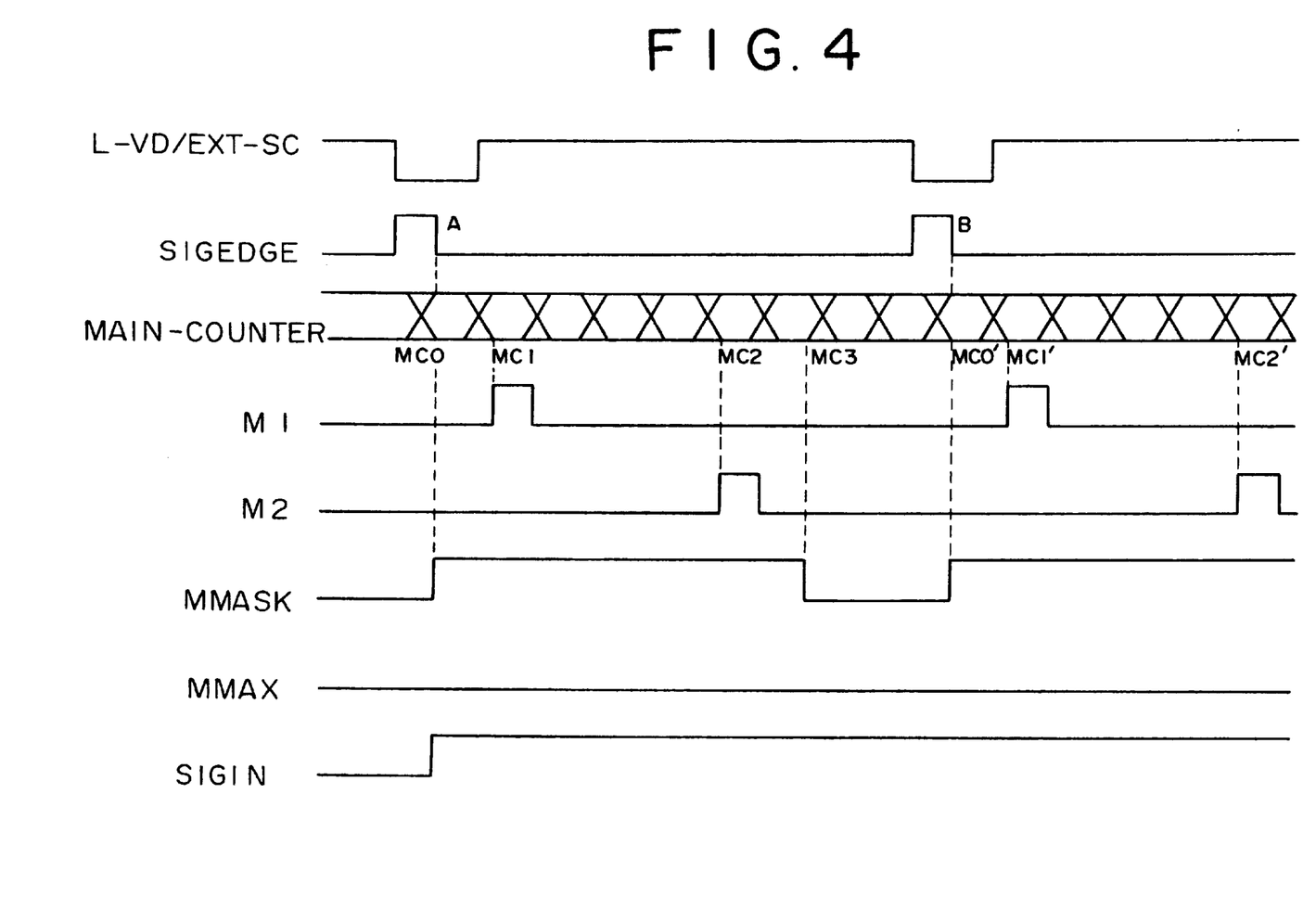
FIG. 4 is a waveform chart of signals obtained in component circuits when square wave signals are inputted successively to the signal discriminator.

FIG. 4 shows waveforms of signals obtained in the component elements of the square wave/burst signal discriminating circuit 8 when square wave signals (L-VD) are successively inputted thereto.

In this case, the main counter circuit 12 starts its count after being reset in synchronism with the trailing edge of the SIGEDGE signal A, and the count value thereof is decoded in the decoding circuit 13.

The decoding circuit 13 turns the MMASK signal from a low level to a high level upon start of the count, i.e., at the time point when the decoded count value thereof is MC0, and then outputs the high-level MMASK signal to the main counter circuit 12. The decoding circuit 13 further turns the MMASK signal from a high level to a low level when the decoded count value has reached a predetermined value MC3.

Meanwhile the signal input state detector circuit 14 turns the SIGIN signal from a low level to a high level in synchronism with the trailing edge of the SIGEDGE signal A, and then outputs the high-level SIGIN signal to the discrimination signal output circuit 18.

Since square wave signals (L-VD) are successively inputted in this case, a new square wave signal (L-VD) is inputted until another predetermined value MC4 after the count value of the main counter 12 reaches the predetermined value MC3 where the MMASK signal is turned to a low level, and then a SIGEDGE signal B is outputted from the signal change detector circuit 11.

Therefore the count of the main counter circuit 12 is reset in synchronism with the trailing edge of the SIGEDGE signal B, and then the circuit 12 newly starts its count again.

More specifically, the above predetermined values MC3 and MC4 are so set that a new square wave signal (L-VD) based on the alternating current signal of 60 Hz is inputted after the MMASK signal outputted from the decoding circuit 13 is turned to a low level and before the decoded count of the decoding circuit 13 reaches the predetermined value MC4, whereby high-level SIGIN signals are outputted successively from the signal input state detector circuit 14. Consequently, the operation mode is switched to the line lock mode which is one of the external sync modes.

Figure 5:
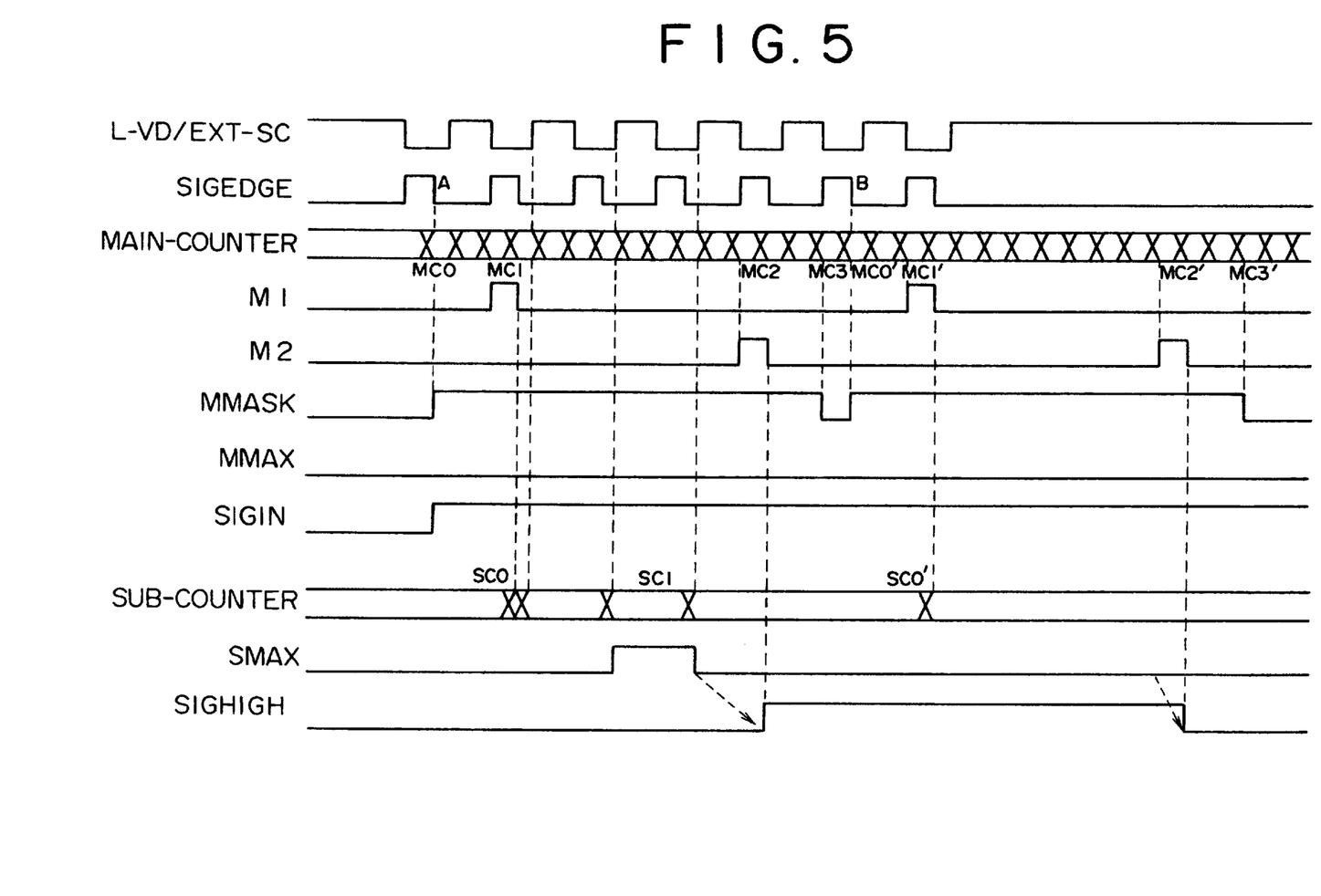
FIG. 5 is a waveform chart of signals obtained when input of a burst signal to the signal discriminator is interrupted after a lapse of a fixed time period.

FIG. 5 shows waveforms of signals obtained in the component elements of the square wave/burst signal discriminating circuit 8 when a burst signal (EXT-SC) is inputted thereto and then the signal supply is brought to a halt after a lapse of a fixed time period.

In this case, the main counter circuit 12 starts its count after being reset in synchronism with the trailing edge of the SIGEDGE signal A, and the count value thereof is decoded in the decoding circuit 13.

The decoding circuit 13 turns the MMASK signal from a low level to a high level at the count start point MC0 and then outputs the high-level MMASK signal to the main counter 12.

Meanwhile in the signal input state detector circuit 14, the output SIGIN signal is turned from a low level to a high level in synchronism with the trailing edge of the SIGEDGE signal A, and the high-level SIGIN signal is outputted to the discrimination signal output circuit 18.

Thereafter, when the decoded count of the decoding circuit 13 has reached the predetermined value MC1, an M1 signal is outputted therefrom to the subcounter circuit 15. Subsequently the subcounter circuit 15 starts its counting action after being reset in synchronism with the trailing edge (time point SC0) of the M1 signal, and increments the count value in synchronism with the rising edge of the input burst signal (EXT-SC).

When the count of the subcounter circuit 15 has reached the predetermined value SC1, the decoding circuit 16 turns the SMAX signal from a low level to a high level only during the period in which the above count is identical with the predetermined value SC1, and then outputs the high-level SMAX signal to the high-frequency signal detector circuit 17.

Subsequently the SMAX signal is stored in the high-frequency signal detector circuit 17 and, in response to the M2 signal fed thereto from the decoding circuit 13, the detector circuit 17 turns the SIGHIGH signal from a low level to a high level in synchronism with the trailing edge of the M2 signal, and then outputs the high-level SIGHIGH signal therefrom.

And when the count of the main counter circuit 12 has reached the predetermined value MC3, the decoding circuit 13 turns the MMASK signal from a high level to a low level and then outputs the low-level MMASK signal to the main counter circuit 12. If another burst signal (EXT-SC) is newly inputted in this state, i.e., if a SIGEDGE signal B is supplied from the signal change detector circuit 11 to the main counter circuit 12, this circuit 12 is reset in synchronism with the trailing edge of the SIGEDGE signal B and newly starts its counting action again. And when the count thereof has reached a predetermined value MC1', the main counter circuit 12 outputs the M1 signal to the counter circuit 15 again.

In response to the M1 signal fed from the decoding circuit 13 relative to the main counter circuit 12, the subcounter circuit 15 newly starts its counting action in synchronism with the trailing edge (time point SC0') of the M1 signal.

When the burst signal (EXT-SC) being fed via the input terminal $T_2$ is brought to a halt, the count of the subcounter circuit 15 does not reach the predetermined value SC1, so that the SMAX signal outputted from the decoding circuit 16 is maintained at its low level. Meanwhile in the high-frequency signal detector circuit 17, the low-level SMAX signal is stored, and the SIGHIGH signal is turned from a high level to a low level in synchronism with the trailing edge of the M2 signal inputted from the decoding circuit 13.

Figure 6:
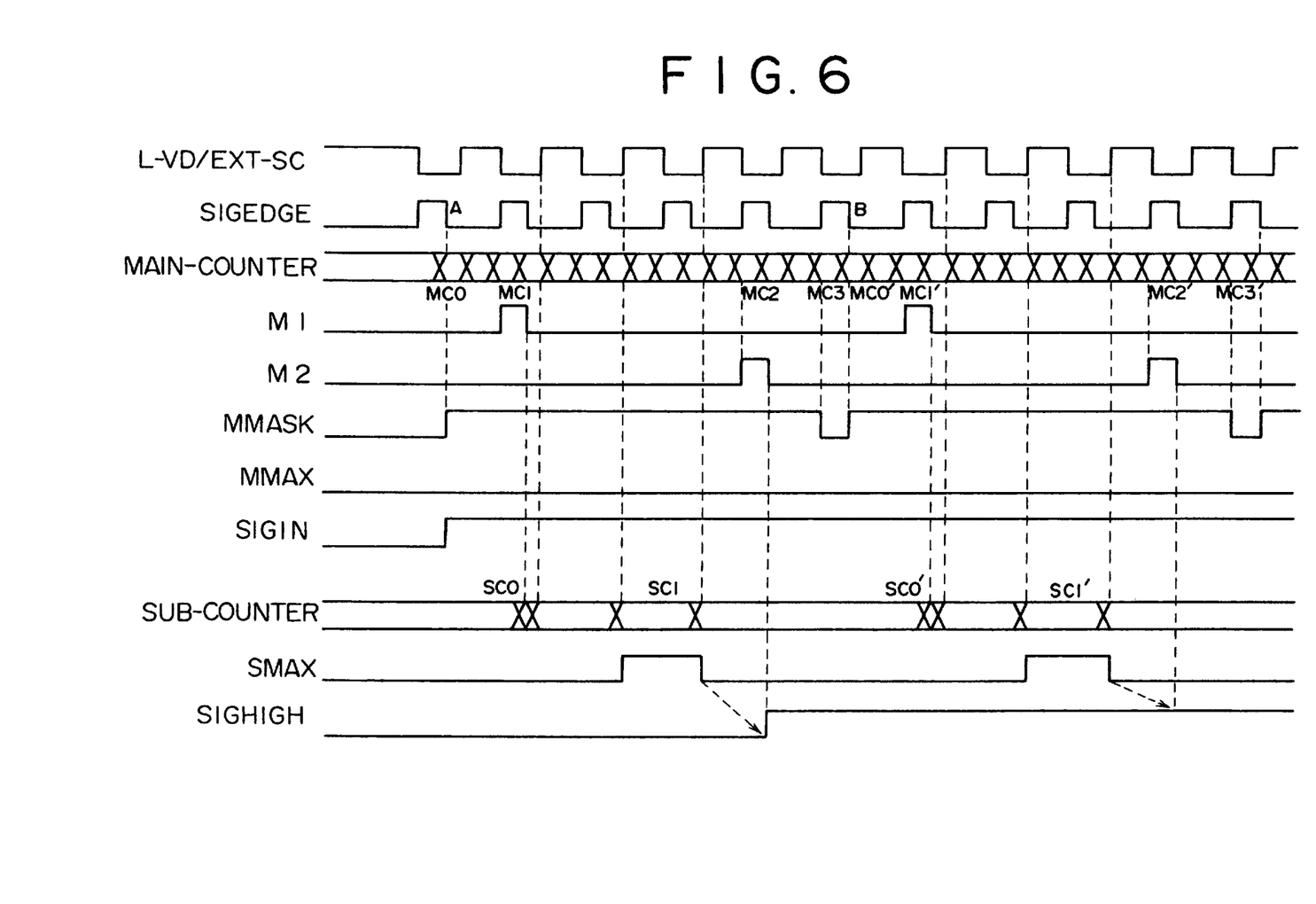
FIG. 6 is a waveform chart of signals obtained when burst signals are inputted successively to the signal discriminator.

FIG. 6 shows waveforms of signals obtained in the component elements of the square wave/burst signal discriminating circuit 8 when burst signals (EXT-SC) are successively inputted thereto.

In this case, the main counter circuit 12 starts its count after being reset in synchronism with the trailing edge of the SIGEDGE signal A, and the count value thereof is decoded in the decoding circuit 13.

The decoding circuit 13 turns the MMASK signal from a low level to a high level upon start of the count at the time point MC0, and then outputs the high-level MMASK signal to the main counter circuit 12.

Meanwhile the signal input state detector circuit 14 turns the SIGIN signal from a low level to a high level in synchronism with the trailing edge of the SIGEDGE signal A, and then outputs the high-level SIGIN signal to the discrimination signal output circuit 18.

Subsequently the decoding circuit 13 outputs the M1 signal to the subcounter circuit 15 when the decoded count has reached the predetermined value MC1. The subcounter circuit 15 starts its counting action after being reset in synchronism with the trailing edge of the M1 signal at the time point SC0, and then increments the count value in synchronism with the trailing edge of the input burst signal (EXT-SC).

When the count of the subcounter circuit 15 has reached the predetermined value SC1, the decoding circuit 16 turns the SMAX signal from a low level to a high level only during the period of the count value SC1, and outputs the high-level SMAX signal to the high-frequency signal detector circuit 17.

Then the SMAX signal is stored in the high-frequency signal detector circuit 17 and, in response to the M2 signal fed thereto from the decoding circuit 13, the detector circuit 17 turns the SIGHIGH signal from a low level to a high level in synchronism with the trailing edge of the M2 signal, and outputs the high-level SIGHIGH signal therefrom.

And when the count of the main counter circuit 12 has reached the predetermined value MC3, the decoding circuit 13 turns the MMASK signal from a high level to a low level and then outputs the low-level MMASK signal to the main counter circuit 12. If another burst signal (EXT-SC) is newly inputted in this state, i.e., if a SIGEDGE signal B is supplied from the signal change detector circuit 11 to the main counter circuit 12 as shown in the diagram, the main counter circuit 12 is reset in synchronism with the trailing edge of the SIGEDGE signal B and newly starts its counting action again. And when the count thereof has reached a predetermined value MC1', the main counter circuit 12 outputs the M1 signal to the counter circuit 15 again.

In response to the M1 signal fed from the decoding circuit 13 relative to the main counter circuit 12, the subcounter circuit 15 newly starts its counting action in synchronism with the trailing edge (time point SC0') of the M1 signal.

In this case, since the burst signals (EXT-SC) are inputted continuously, the count value of the subcounter circuit 15 is incremented in synchronism with the rising edge of each burst signal (EXT-SC). Consequently, when the count value decoded in the decoding circuit 16 has reached a predetermined value SC1', the decoding circuit 16 turns the SMAX signal, which is outputted during the period of the count value SC1', to a high level and then outputs the high-level SMAX signal to the high-frequency signal detector circuit 17, where the SMAX signal is stored.

Therefore the SIGHIGH signal outputted from the high-frequency signal detector circuit 17 is maintained at its high level even in case the M2 signal is inputted from the decoding circuit 13.

Figure 7:
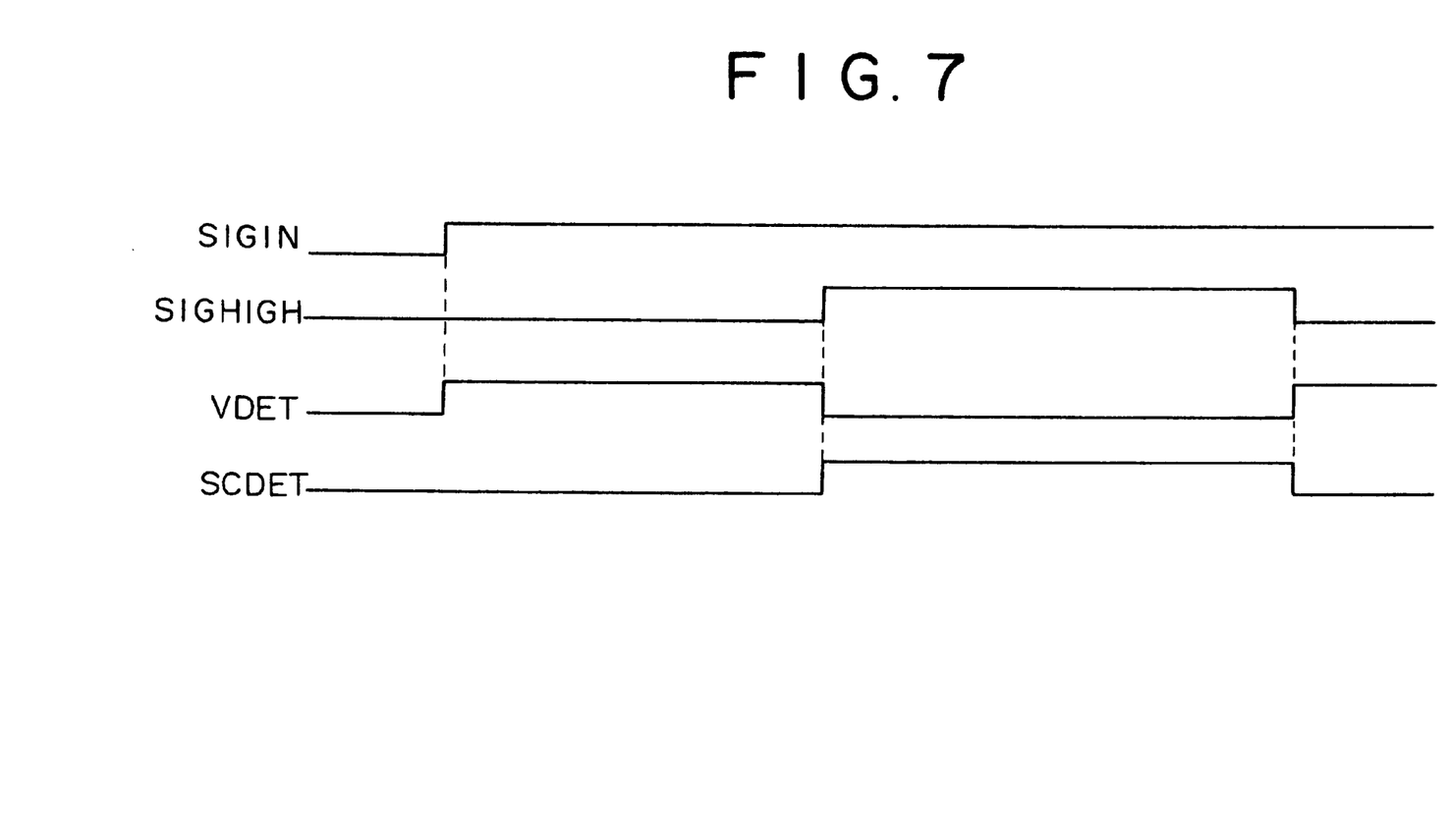
FIG. 7 shows waveforms of input and output signals in a discrimination signal output circuit included in the signal discriminator.

In the discrimination signal detector circuit 18, when the input SIGIN signal has a high level and the SIGHIGH signal has a low level as shown in FIG. 7, the input signal is discriminated as a square wave signal (L-VD) and then a VDET signal is outputted. Meanwhile, when the SIGIN signal has a high level and the SIGHIGH signal also has a high level, the input signal is discriminated as a burst signal (EXT-SC) and then a SCDET signal is outputted. Thus, if two kinds of signals are inputted to one input terminal $T_2$, it is possible to discriminate between the kinds of the signals.

In this manner, the signal discriminator according to one preferred embodiment of the present invention is so constructed that a change of the input signal is detected in the signal change detector circuit 11, and either a burst signal (EXT-SC) or a square wave signal (L-VD) derived from an external signal is fed as a count signal to the subcounter circuit 15. Then the kind of the input signal is discriminated depending on the value counted in the subcounter circuit 15 for a fixed time, i.e., by counting the period of the input signal. Consequently, it is possible to discriminate the input signal properly if the signal fed to one input terminal $T_2$ is a burst signal (EXT-SC) or a square wave signal (L-VD).

In the above embodiment representing the signal discriminator of the invention, an explanation has been given with regard to an exemplary case of discriminating between a square wave signal (L-VD) and a burst signal (EXT-SC). However, the signal discriminator is not limited to such example alone, and it is rendered possible to discriminate between two kinds of signals of different frequencies by varying the predetermined count values (MC1, MC2, MC3, MC4) of the main counter circuit 12 and the predetermined count value (SC1) of the subcounter circuit 15.

It is further rendered possible to discriminate among three or more input signals of different frequencies by additionally setting more predetermined count values of the subcounter circuit 15.

As mentioned hereinabove, according to the signal discriminator of the present invention having a first counter reset cyclically in the repetition period of an input signal and a second counter to count the input signal, the input signal can be discriminated on the basis of whether the count value of the first counter has already reached the second count value at the time when the second counter has reached the fourth count value. Therefore, if different kinds of signals are fed to one input terminal, either input signal can be discriminated properly.

And in an IC configuration where a sync signal generator is equipped with such a signal discriminator, there is achieved an advantageous effect of reducing the number of input terminals allocated to the sync signal generator.

Although the present invention has been described above with reference to some preferred embodiments thereof, it is to be understood that the invention is not limited to such embodiments alone, and a variety of other changes and modifications will be apparent to those skilled in the art without departing from the spirit of the invention.

The scope of the invention, therefore, is to be determined solely by the appended claims.

What is claimed is:

1. A signal generator comprising:
  an input terminal supplied with a first signal or a second signal higher in frequency than the first signal;
  a discriminating means supplied with the first or second signal from said input terminal, then discriminating between the first and second signals based on different frequencies thereof, and outputting a discrimination signal in accordance with the discrimination;
  a sync signal generating means supplied with the first or second signal from said input terminal and also with the discrimination signal from said discriminating means, and outputting a sync signal that is synchronized with the first or second signal in accordance with the discrimination signal; and
  an output terminal supplied with the sync signal, which is synchronized with the first or second signal, from said signal generating means.

2. The signal generator according to claim 1, further comprising an external signal generating means connected to said input terminal and supplying the first or second signal to said input terminal.

3. A signal generator comprising:
  an input terminal supplied with a first signal or a second signal higher in frequency than the first signal;
  a discriminating means supplied with the first or second signal from said input terminal, then discriminating between the first and second signals, and outputting a discrimination signal;
  a signal generating means supplied with the first or second signal from said input terminal and also with the discrimination signal from said discriminating means, and outputting a signal synchronized with the first or second signal in accordance with the discrimination signal;
  an output terminal supplied with the signal, which is synchronized with the first or second signal, from said signal generating means; and
  a clock generating means which supplies a clock signal to said signal generating means, wherein, when none of the first and second signals is supplied to said input terminal, said signal generating means generates a signal synchronized with the clock signal.

4. The signal generator according to claim 3, wherein said discriminating means comprises: a first counter supplied with the clock signal from said clock generating circuit and reset by the first or second signal received from said input terminal, said first counter being so controlled as to halt counting the clock signal when the count thereof has reached a third predetermined value (MC4); a first detecting means for outputting a detection signal relative to the first or second signal during the counting action of said first counter; a second counter supplied with the clock signal which is the first or second signal and reset when the count of said first counter has reached a first predetermined value (MC1) said second counter being so controlled as to halt counting the clock signal when the count of said first counter has reached a second predetermined value (MC2: MC2<MC4), and to output a detection signal (SMAX) when the count thereof has reached a fourth predetermined value (SC1); a second detecting means for outputting a detection signal relative to the second signal in response to the detection signal (SMAX) received from said second counter; and a third detecting means supplied with the detection signals from both of said first and second detecting means and outputting a discrimination signal relative to the first and second signals in accordance with such detection signals.

5. A signal generator comprising:

an input terminal supplied with a first signal or a second signal higher in frequency than the first signal;

a discriminating means supplied with the first or second signal from said input terminal, then discriminating between the first and second signals, and outputting a discrimination signal;

a signal generating means supplied with the first or second signal from said input terminal and also with the discrimination signal from said discriminating means, and outputting a signal synchronized with the first or second signal in accordance with the discrimination signal;

an output terminal supplied with the signal, which is synchronized with the first or second signal, from said signal generating means; and an external signal generating means connected to said input terminal and supplying the first or second signal to said input terminal;

wherein said external signal generating means forms a square wave signal out of an alternating current obtained from an AC power source and then supplies the square wave signal as the first signal to said input terminal, or separates a burst signal from an external video signal and then supplies the burst signal as the second signal to said input terminal.

6. The signal generator according to claim 5, wherein said external signal generating means separates a sync signal from the external video signal, said signal generator further having a second input terminal supplied with the sync signal, and a sync signal discriminating circuit supplied with the sync signal from said second input terminal, wherein the sync signal obtained from said second input terminal and a sync signal discrimination signal obtained from said sync signal discriminating circuit are both supplied to said signal generating means, which then produces, on the basis of the sync signal discrimination signal, a signal synchronized with the sync signal received from said second input terminal.

7. A signal discriminator comprising:

an input terminal supplied with a first signal or a second signal higher in frequency than the first signal;

a clock generating circuit for generating a clock signal;

a first counter supplied with the clock signal from said clock generating circuit and reset by the first or second signal received from said input terminal, said first counter being so controlled as to halt counting the clock signal when the count thereof has reached a third predetermined value (MC4);

a first detecting means for outputting a detection signal relative to the first or second signal during the counting action of said first counter; a second counter supplied with the clock signal which is the first or second signal and reset when the count of said first counter has reached a first predetermined value (MC1), said second counter being so controlled as to halt counting the clock signal when the count of said first counter has reached a second predetermined value (MC2: MC2<MC4), and to output a detection signal (SMAX) when the count thereof has reached a fourth predetermined value (SC1);

a second detecting means for outputting a detection signal relative to the second signal in response to the detection signal (SMAX) received from said second counter; and a third detecting means supplied with the detection signals from both of said first and second detecting means and outputting a discrimination signal relative to the first and second signals in accordance with such detection signals.

8. The signal discriminator according to claim 7, wherein the first signal is a square wave signal formed out of an alternating current obtained from an AC power source, and the second signal is a burst signal separated from the video signal.

9. A signal generator comprising:

an input terminal supplied with a first signal or a second signal higher in frequency than the first signal;

a discriminator supplied with the first or second signal from said input terminal, and configured to discriminate between the first and second signals based on different frequencies thereof, and output a discrimination signal in accordance with the discrimination between the first and second signals;

a sync signal generating circuit supplied with the first or second signal from said input terminal and also with the discrimination signal from said discriminator, and outputting a sync signal synchronized with the first or second signal in accordance with the discrimination signal; and an output terminal supplied with the synchronized signal output by said signal generating circuit.

10. The signal generator according to claim 9, further comprising external signal generating circuitry connected to said input terminal and supplying the first or second signal to said input terminal.

11. A signal generator comprising:

an input terminal supplied with a first signal or a second signal higher in frequency than the first signal, said first signal being a square wave signal derived from an AC power source and said second signal being a burst signal of a video signal;

a discriminator supplied with the first or second signal from said input terminal, and configured to discriminate between the first and second signals, and output a discrimination signal in accordance with the discrimination between the first and second signals;

a signal generating circuit supplied with the first or second signal from said input terminal and also with the discrimination signal from said discriminator, and outputting a signal synchronized with the first or second signal in accordance with the discrimination signal; and an output terminal supplied with the synchronized signal output by said signal generating circuit.

12. A signal generator comprising:

an input terminal supplied with a first signal or a second signal higher in frequency than the first signal;

a discriminator supplied with the first or second signal from said input terminal, and configured to discriminate between the first and second signals, and output a discrimination signal in accordance with the discrimination between the first and second signals;

a signal generating circuit supplied with the first or second signal from said input terminal and also with the discrimination signal from said discriminator, and outputting a signal synchronized with the first or second signal in accordance with the discrimination signal;

an output terminal supplied with the synchronized signal output by said signal generating circuit; and a clock generator which supplies a clock signal to said signal generating circuit, wherein, when none of the first and second signals is supplied to said input terminal, said signal generating circuit generates a signal synchronized with the clock signal.

* * * * *